C. A. WALTERS.
DRAFTING INSTRUMENT.
APPLICATION FILED MAY 3, 1921.

1,422,641.

Patented July 11, 1922.

Inventor
Charles A. Walters.
By J. M. St. John
Atty.

UNITED STATES PATENT OFFICE.

CHARLES A. WALTERS, OF MARION, IOWA.

DRAFTING INSTRUMENT.

1,422,641.  Specification of Letters Patent.  Patented July 11, 1922.

Application filed May 3, 1921. Serial No. 466,590.

*To all whom it may concern:*

Be it known that I, CHARLES A. WALTERS, a citizen of the United States, residing at Marion, in the county of Linn and State of Iowa, have invented certain new and useful Improvements in Drafting Instruments; and I do hereby declare the following to be a full, clear, and exact description of the invention, such as will enable others skilled in the art to which it appertains to make and use the same.

The object of this invention is to provide an instrument easily attachable to a drafting-board, by means of which angles may be determined, parallel lines ruled, and measurements made by a sliding scale to nearly double the length of the scale, without detaching the same.

The invention is fully disclosed in the description and claims following, reference being made to the accompanying drawing, in which:—

Figure 1:
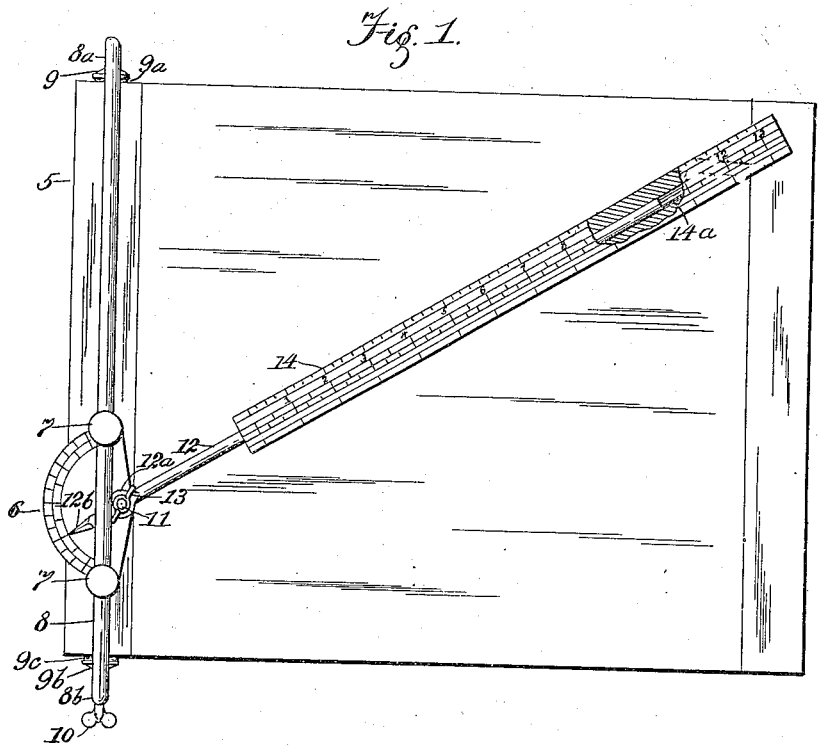
Figure 2:
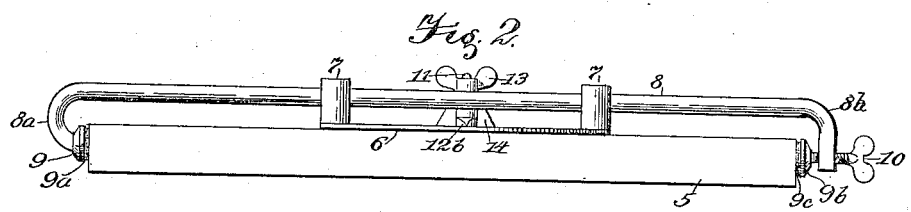
Figure 3:
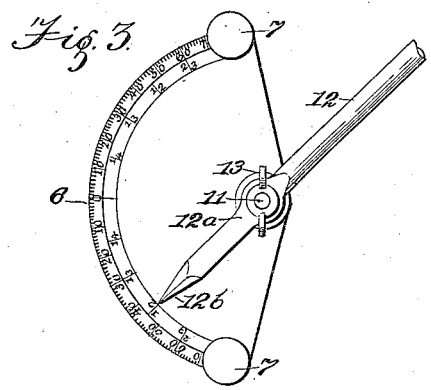

Fig. 1 is a plan view of my drafting instrument as attached to a drawing-board. Fig. 2 is an elevation of the same as seen from the left of Fig. 1. Fig. 3 is an enlarged view, showing the protractor and its connected indicator and rule-guide.

In the drawing, the numeral 5 denotes an ordinary drawing-board, which in practice may be much longer, relatively, than shown, but is presumed to be made of a suitable width to fit the instrument.

To a protractor plate 6 is attached a pair of studs or posts 7 bored transversely to receive, with a nice sliding fit, a guide-rod 8, with a little space between the rod and the plate. One end of the rod is bent to form a goose-neck 8$^a$, and to this is secured a foot-piece 9, preferably faced with some non-marring material, such as leather, 9$^a$. The bearing face of the foot is at right angles to the guide-rod. The other end of the rod, 8$^b$ is bent at a right angle to the body of the rod, and drilled and tapped for a thumb-screw 10. To the end of the thumb-screw is revolubly attached a foot 9$^b$, similar to that at the other end of the rod, and preferably faced in the same manner with leather 9$^c$, or the like. By this means the guide-rod may be clamped to the edges of the board, as shown, and at any desired point along the length of the same, or its position on the board reversed, as desired.

On a threaded stud 11 rising from the inner side of the protractor-plate, is mounted a straight rod 12, which is flattened at 12$^a$ and pierced to receive the stud. A winged nut 13 serves to bind the rod securely in any desired position. The flattened end of the rod passes under the guide-rod above described, and terminates in a pointer 12$^b$ adapted to indicate the graduations on the protractor. These graduations, as shown in Fig. 3 begin midway at zero, and extend each way therefrom. For convenience in architectural work the protractor is graduated for roof pitches, as well as degrees.

On the main shaft of the rod 12 is slipped a scale 14, preferably of the triangular type commonly used by engineers and architects, and bored at 14$^a$ from end to end to receive the rod. Either the scale or the rod may be used as a straight-edge for drawing lines at any desired angle. By sliding the scale on the rod, lines or measurements may be extended to nearly double the length of the rod. The scale may also be turned on the rod, and end for end, so that any of its graduated edges may be used. By sliding the protractor on its guide, the scale may be applied to a wide area of work, for any of the operations above indicated.

Having thus described my invention, I claim:

1. A drafting instrument, comprising a protractor, a guide on which it is slidably mounted, a rod adapted to serve as a straight-edge and angle indicator pivoted at the protractor center, a clamping nut to bind the rod in position, and a slidable scale mounted revolubly on said rod.

7. A drafting instrument, comprising a protractor, a guide on which it is slidably mounted, an angle-indicating rod pivoted at the protractor center on an upstanding stud. a binding nut on the stud, and a scale bored from end to end to fit slidably and revolubly on said rod.

3. A drafting instrument, comprising a protractor provided with a pair of bearing posts and a central stud, an angle-indicating straight-edge mounted on the stud, a clamping nut therefor, and a guide on which the posts are slidable adapted for detachable connection with a drawing-board.

4. A drafting instrument, comprising a protractor, an angle-indicator therefor, and a guide for the protractor, the same being a rod provided at one end with a backwardly turned goose-neck provided with a foot, and at the other end with an angle-bend, and a thumb-screw with a revoluble foot mounted thereon, whereby the guide may be clamped to the edges of a drawing-board.

In testimony whereof I affix my signature in presence of two witnesses.

CHARLES A. WALTERS.

Witnesses:
C. E. LEIGH,
AUGUSTA NAILEN.